(12) United States Patent
Muta

(10) Patent No.: US 6,772,297 B2
(45) Date of Patent: Aug. 3, 2004

(54) CACHE CONTROLLING DEVICE AND PROCESSOR

(75) Inventor: Toshiyuki Muta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 09/817,258

(22) Filed: Mar. 27, 2001

(65) Prior Publication Data

US 2002/0040421 A1 Apr. 4, 2002

(30) Foreign Application Priority Data

Oct. 2, 2000 (JP) ........................................ 2000-302795

(51) Int. Cl.$^7$ ............................................. G06F 12/08
(52) U.S. Cl. ........................... 711/140; 711/13; 710/54
(58) Field of Search ................................. 711/126, 133, 711/137, 140, 127, 130, 134, 204, 125; 710/39, 54

(56) References Cited

U.S. PATENT DOCUMENTS

| | | | |
|---|---|---|---|
| 5,854,934 A | * 12/1998 | Hsu et al. ................... | 717/161 |
| 6,389,529 B1 | * 5/2002 | Arimilli et al. .............. | 712/225 |
| 6,401,192 B1 | * 6/2002 | Schroter et al. ............ | 712/207 |
| 6,418,516 B1 | * 7/2002 | Arimilli et al. .............. | 711/138 |
| 6,446,170 B1 | * 9/2002 | Chan et al. .................. | 711/132 |

FOREIGN PATENT DOCUMENTS

| | | |
|---|---|---|
| JP | 8-278920 | 10/1996 |
| JP | 11-102320 | 4/1999 |

* cited by examiner

Primary Examiner—Gary Portka
(74) Attorney, Agent, or Firm—Staas & Halsey LLP

(57) ABSTRACT

To perform a data replace control activated prior to the execution of a cache memory reference instruction so as to reduce the latency when a miss occurs to a cache memory.

In a cache replace control of a load store unit, a load store unit controlling device comprises a first queue selection logical circuit 41, a second queue selection logical circuit 42 and a mediating unit 43, wherein the first queue selection logical circuit sequentially selects access instructions to access the cache memory which are stored in queues 31, wherein the second queue selection logical circuit selects unissued access instructions of the access instructions to access the cache memory which are stored in the queues prior to the selections by the first queue selection logical circuit, and wherein the mediating unit mediates between the access instructions selected by the first queue selection logical circuit and the pre-access instructions selected by the second queue selection logical circuit for accessing the cache memory.

29 Claims, 16 Drawing Sheets

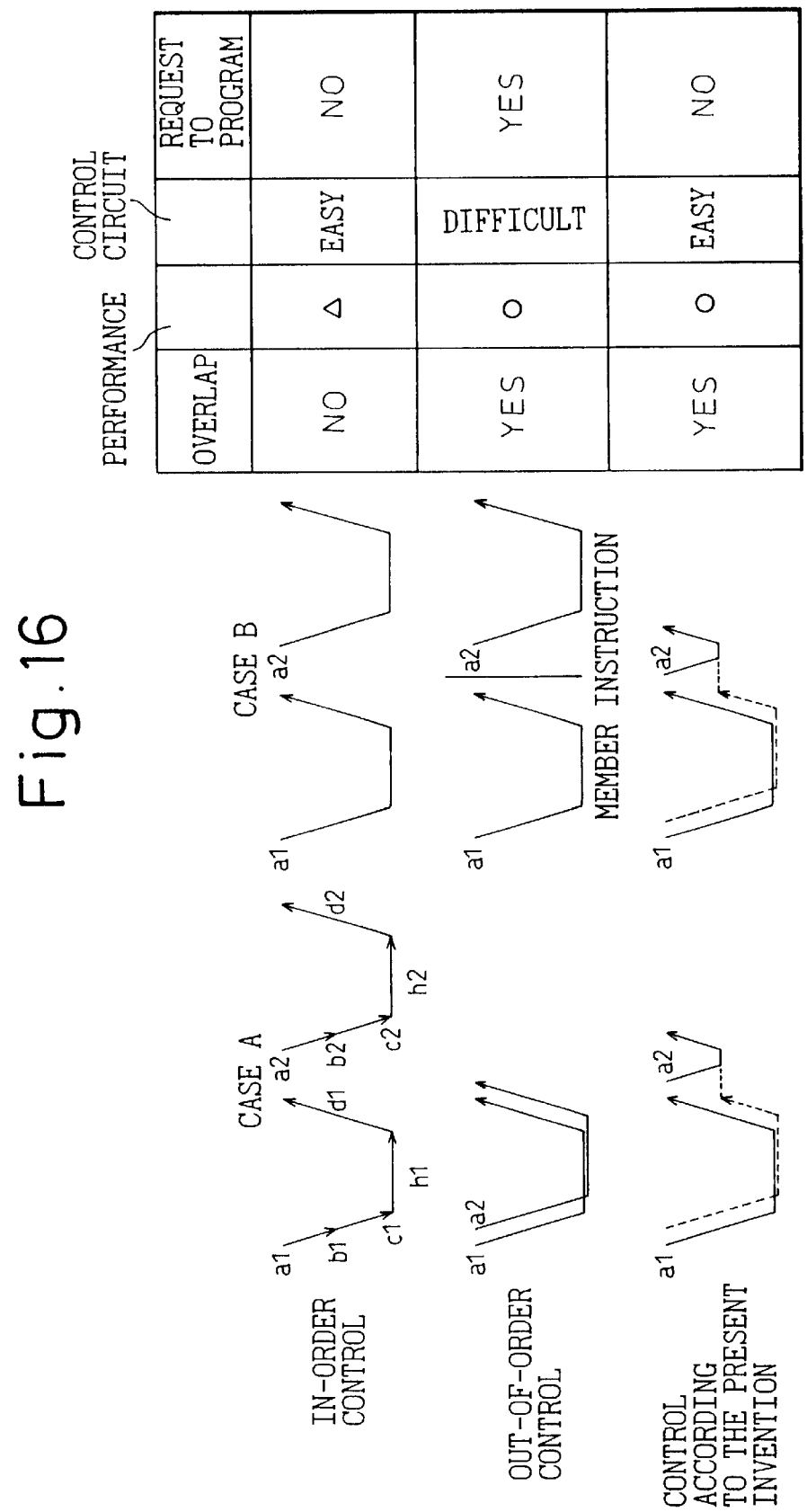

CACHE CONTROLLING DEVICE AND PROCESSOR

BACKGROUND OF THE INVENTION

1. Field of the Invention

The present invention relates to a microprocessor for a computer and, more particularly, to a cache controlling device for reducing latency, when there occurs a cache miss, by performing a replace control activated prior to the execution of a memory reference instruction, and a processor.

2. Description of the Related Art

In a microprocessor, an in-order control is operated through a pipeline configuration in which processing is carried out in the order of issuance of instructions, and it is ensured that the instructions are executed and completed through the in-order control even with respect to software, thus the software is also configured to be implemented based on the in-order control.

In recent years, by using superscalar and register renaming techniques there have been realized microprocessors in which, while an out-of-order control is being performed in which instructions are executed without following the order of issuance of the instructions as long as there exists no dependent relationship between the instructions, it looks like the instructions are completed sequentially when observing the execution of the instructions from the software side.

The same thing is occurring with respect to reading from and writing to a memory. However, there are things to be considered separately. For example, when thinking of reading from and writing in a memory, there is a case where a dependent relationship is intended depending upon programs which cannot be determined only by decoding an instruction.

Here, such a case will be described through the following two examples each including two instructions.

EXAMPLE 1

(1) load (d0), d1
(2) load (d1), d3

EXAMPLE 2

(3) load (d0), d1
(4) load (d2), d3

EXAMPLE 1

With Instruction (1), data stored at the address d0 in the memory is read and is then stored in d1, and with Instruction (2), data stored at the address d1 in the memory is read and is then stored in d3. Since the result of Instruction (1) is used in Instruction (2), there exists a dependent relationship between the instructions. Then, the hardware can determine that the instructions should be issued in the order of Instructions (1) and (2).

EXAMPLE 2

With Instruction (3), data stored at the address d0 in the memory is read and is then stored in d1, and with Instruction (4), data stored at the address d2 in the memory is read and is then stored in d3. However, since the hardware cannot determine the sequence between Instructions (3) and (4), whether or not the sequence guarantee is needed should be determined depending upon the intention of the program. Then, two cases, Cases A, B, could be thought of as follows.

Case A;

The results remain the same even if the data is read in a different order provided that it is ensured that the two pieces of data have not been changed when Instruction (4) is reached.

Case B;

If the data of Instruction (3) means a flag for indicating the validity of the data, the situation becomes different from Case A. In a case where another processor writes the data of Instruction (4) and thereafter writes in the data of Instruction (3) a value indicating that the data is valid, if the instructions are executed in a different order from the present row of instructions, the data is read before the data is written by Instruction (4), and the data is read which results after the data of Instruction (3) is written. As a result, a phenomenon arises in which the data indicated as valid becomes old.

Thus, while the order can be changed with Case A, with Case B the order cannot be changed, and the hardware cannot determine the order. This means that it is only a programmer who can determine the order.

Due to this, conventionally, with Case B being assumed, a system has been adopted in which the sequential control is effected.

However, in recent years, Case A is assumed and the sequence guarantee is alleviated. With respect to Case B, the programmer configures a program in which an exclusive instruction for guaranteeing the sequence is inserted between instructions for requesting the sequence guarantee, so that a system is adopted in which the hardware guarantees the sequence only when the exclusive instruction is given.

While the process of carrying out the replace control through the in-order control has been described heretofore, when observing the aforesaid Cases A and B, in the case of the in-order control, the hardware operates in a serialized fashion for both the cases. This is because the hardware cannot discriminate between the two cases.

On the other hand, in order for the aforesaid respective instructions to be operated through the out-of-order control, basically, the instructions are to be operated based on Case A. In a case where the instructions are operated through the out-of-order control based on Case B, the discrimination has to be made by inserting a member instruction. The in-order control can be performed only when this member instruction is given.

Namely, a control is needed to switch over the operation mode. Although being superior to the in-order control in performance, as seen with Case B, the out-of-order control is complicated in that, in controlling, the two controls have to be switched over. Furthermore, the insertion of the member instruction is to impose a limitation on the program.

On the contrary, although being inferior in performance, the in-order control is characterized in that it is relatively simple, in control, with no limitation being imposed on the program.

In addition, in an attempt to conceal a latency miss, a replace control is carried out which includes the activation of a next line replacement. In the event that there occurs a cache miss in a cache line of a cache, it is predicted that there also exists a cache miss in the following cache line, and the cache is retrieved. If a cache miss is found in the following cache line, since the replacing activation has been generated, the activation of the next line replacement is effected totally ignoring the characteristic of the program at the time of occurrence of the cache miss. Thus, this leads to a disadvantage that, in a case where accesses occur to addresses at random, a reverse effect may be provided.

Consequently, it is an object of the present invention to provide an in-order control bearing no program limitation which holds the advantages of both the in-order control and the out-of-order control and can perform a replace control for improving the latency when there occurs a cache miss in a cache.

SUMMARY OF THE INVENTION

With a view to attaining the above object, according to the present invention, there is provided a processor for a computer comprising a means for selecting and issuing an access instruction stored in an entry to a queue, a means for accessing a cache memory with the instruction so issued, a means for accessing the cache memory and issuing an instruction to access the next memory when a miss occurs to the cache, a data replace control means for registering data obtained by accessing the next memory in the cache memory, and a pre-access means for accessing the cache memory after the access instruction has been issued from the access instruction issuing means.

Furthermore, according to the present invention, the pre-access means is configured to pre-access the cache memory and issue an instruction to access the next memory when a miss occurs to the cache, to register data obtained by pre-accessing the next memory in the cache memory for carrying out a data replacement, and to end the pre-accessing when the pre-access to the next memory fails.

Moreover, according to the present invention, there is provided a controlling device for a load store unit in a computer comprising at least a first queue selection logical circuit, a second queue selection logical circuit and a mediating unit, wherein the first queue selection logical circuit sequentially selects from an instruction issuing unit access instructions to access the cache memory which are stored in queues, wherein the second queue selection logical circuit selects from the instruction issuing unit unissued access instructions of the access instructions to access the cache memory which are stored in the queues prior to the selections by the first queue selection logical circuit, and wherein the mediating unit mediates between the access instructions selected by the first queue selection logical circuit and the pre-access instructions selected by the second queue selection logical circuit for accessing the cache memory.

BRIEF DESCRIPTION OF THE DRAWINGS

The above object and features of the present invention will be more apparent from the following description of the preferred embodiments with reference to the accompanying drawings, wherein:

FIG. 16 is a comparison diagram comparing a control according to the embodiment of the present invention with in-order and out-of-order controls.

DESCRIPTION OF THE PREFERRED EMBODIMENT

Before describing an embodiment of the present invention, the related art and disadvantages inherent therein will be described with reference to the related figures.

Figure 1:
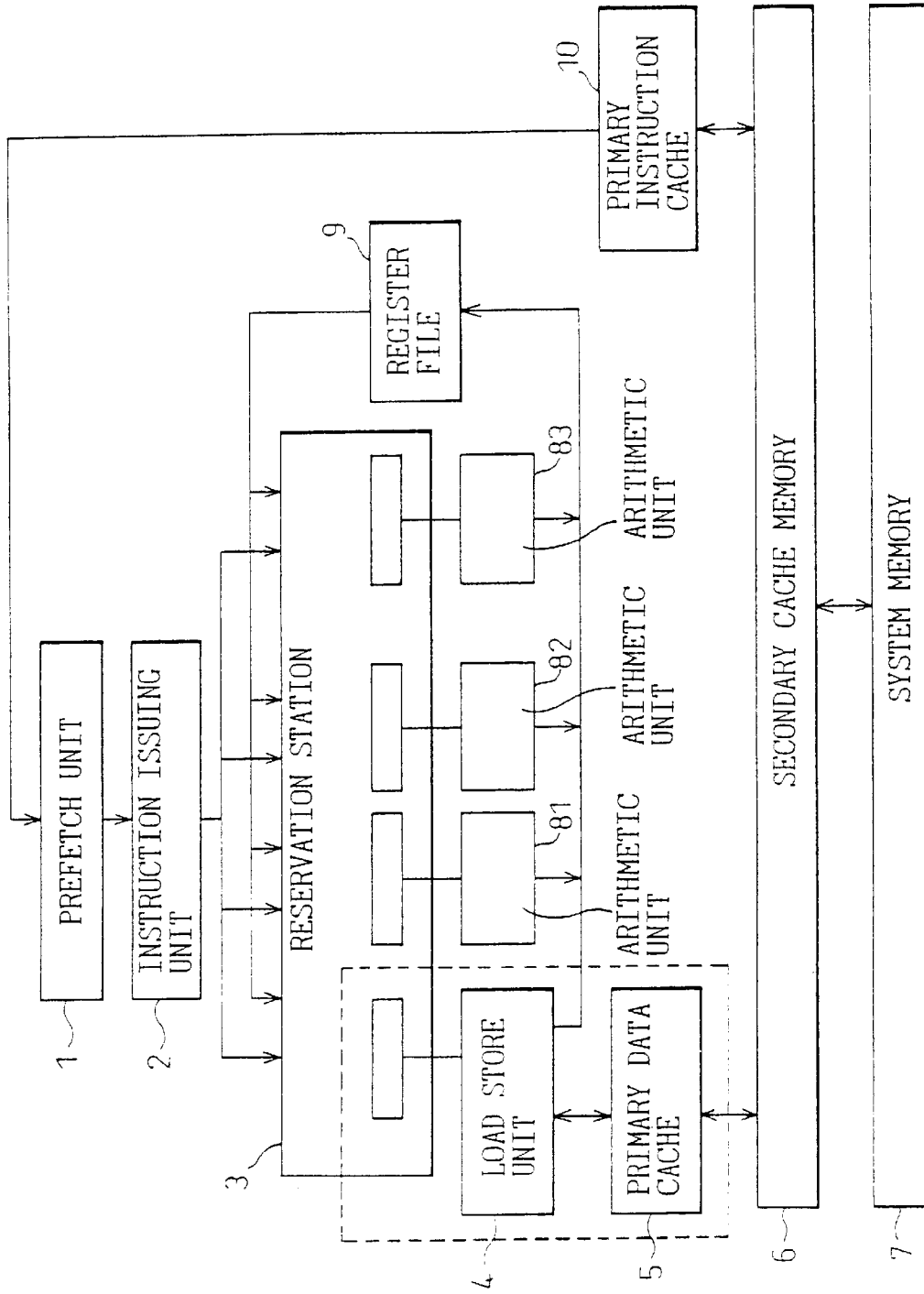
FIG. 1 is a schematic diagram showing the block configuration of a computer.
Figure 2:
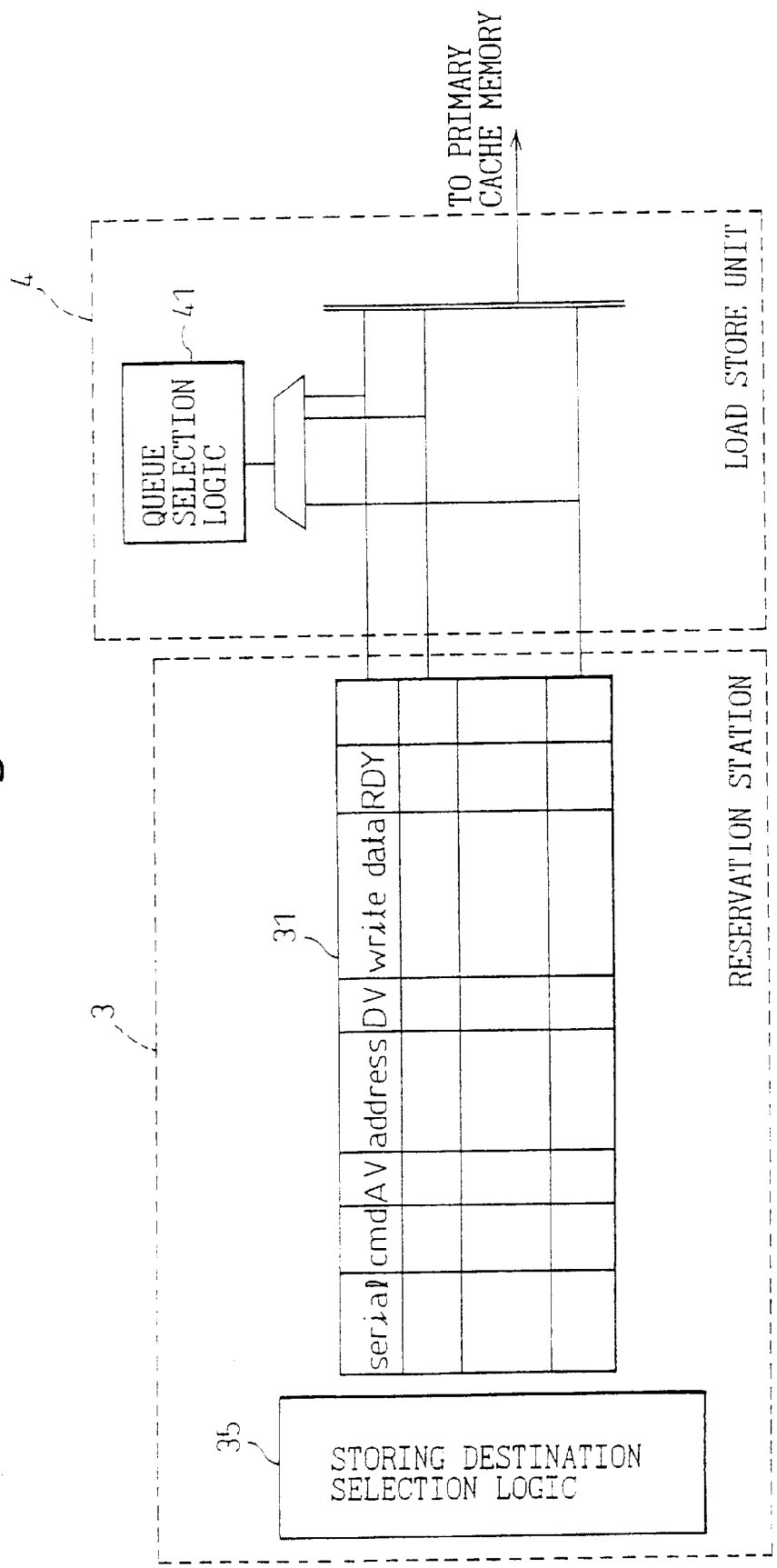
FIG. 2 is a diagram showing the system configurations of a reservation station and a load store unit.
Figure 3:
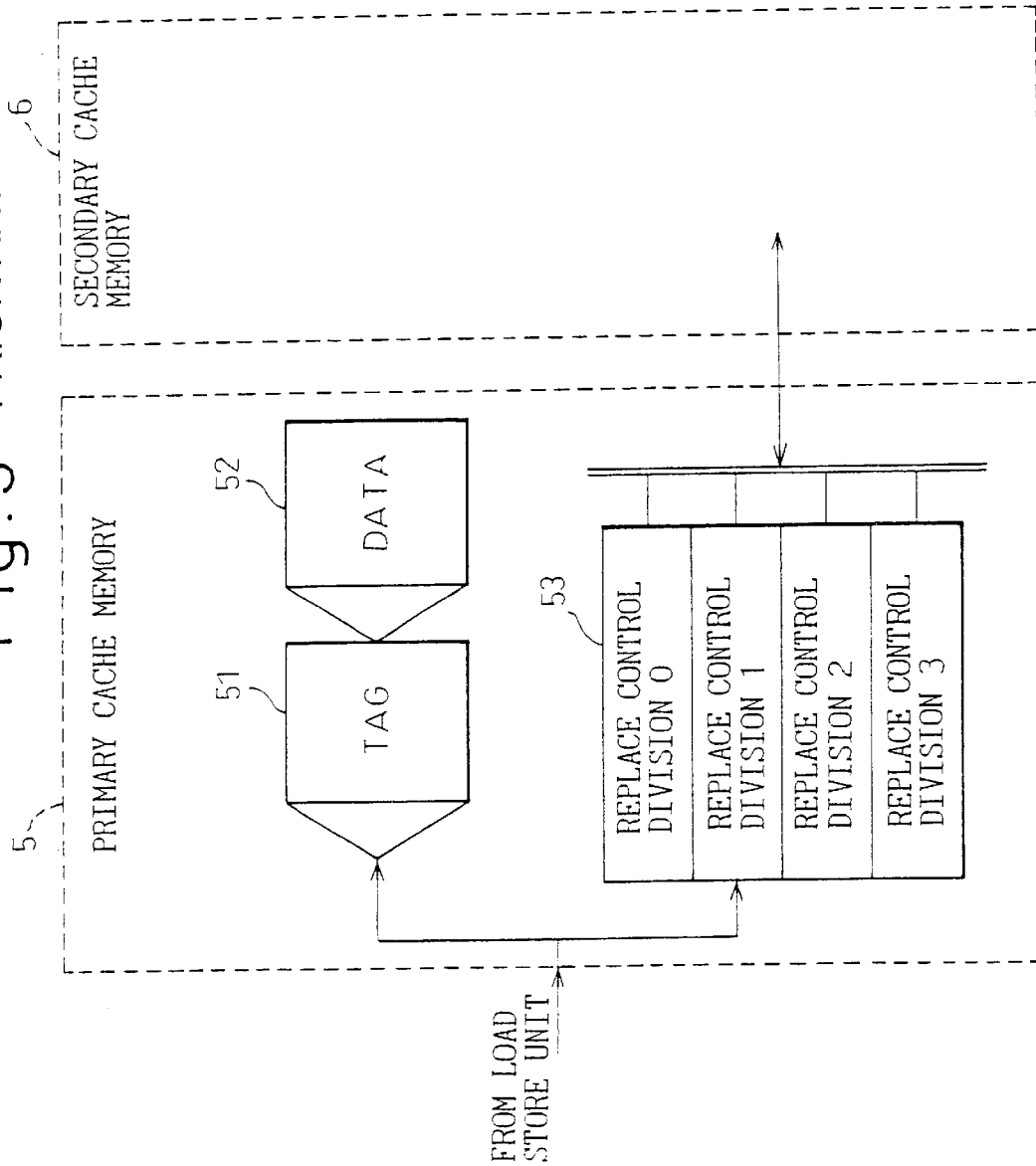
FIG. 3 is a diagram showing the configuration of a cache memory.

Referring to FIGS. 1 to 3, the system configuration of the conventionally used hardware will be described.

FIG. 1 is a schematic block diagram showing the configurations of related portions of a microprocessor and a memory of a computer. The microprocessor includes a prefetch unit 1, an instruction issuing unit 2, a reservation station 3, a load store unit 4, respective arithmetic units 81 to 83, and a register file 9.

A plurality of queues 31 to 34 are prepared in the reservation station 3; the queue 31 corresponding to the load store unit 4 and the queues 32 to 34 corresponding to the respective arithmetic units 81 to 83, to which instructions from the queues 31 to 34 are supplied.

Provided between the microprocessor and a system memory 7 are a primary cache memory 5, a secondary cache memory 6 and a primary instruction cache memory 10. The microprocessor gains access to the primary cache memory 5 via the load store unit 14 and then to the secondary cache memory 6.

Next, the configuration of a portion of FIG. 1 surrounded by a broken line is illustrated in greater detail in FIGS. 2 and 3.

FIG. 2 shows the queue 31 of the reservation station 3 and the load store unit 4. FIG. 3 shows the primary cache memory 5, as well as the secondary cache memory 6, which is illustrated schematically.

The queue 31 is controlled by a ring construction, as well as a storing pointer register and an instruction fetching pointer for issuing an in-order access and constitutes an FIFO configuration.

Entries of the queue 31 consist of respective fields such as "serial," "cmd," "AV," "address," "DV," "write data," and "RDY."

The "serial" is a serial number imparted to every instruction issued from the instruction issuing unit. When a load store instruction is completed, the serial number is used in a completion notice. The "cmd" indicates the type and size of access so as, for example, to discriminate load from store. The "AV" is a valid flag for access. The "address" is the address of a destination to be accessed. The "DV" is a valid flag for write data. The "write data" is a write data field. The "RDY" indicates the status of access.

Provided in the reservation station 3 is a storing destination selection logic 35 for controlling the storage into the entries of the queue 31, which adopts an FIFO configuration. The storing destination thereof is designated with a pointer. When an instruction is put into this queue from the instruction issuing unit, the "serial" and "cmd" are stored in queue entries designated by the pointer, so that the state transition of the "RDY" is performed.

When storing data at an access, a control such as below is carried out; a store designation is given by a combination of an address and a serial number, a comparison between the serial number and the "serial" is carried out at the entries to each queue, the data is stored in the "address" field of an entry where there is a coincidence between the serial number and the "serial," and the "AV" is turned on. A similar control is carried out to the "write data" field and the "DV" for write data.

A queue selection logic 41 is provided in the load store unit 4 for determining the direction of selection of entries issued from the queue 31. Here, the queue selection logic is set to the direction of in-order such that selection is initiated from old entries that can be issued, and entries so selected are sent out to the primary cache memory 5.

Next, the constitution of the primary cache memory 5 shown in FIG. 3 will be described.

Normally, the primary cache memory 5 comprises a tag division 51 and a data division 52. Furthermore, the primary cache memory 5 is provided with replace control divisions 53, so that four replace control resources can be operated in parallel. The resources are activated by cache misses which occur when accessing the primary cache memory 5. In a case where a succeeding access is issued to an address which is in replace activation, a retry is designated.

Figure 4:
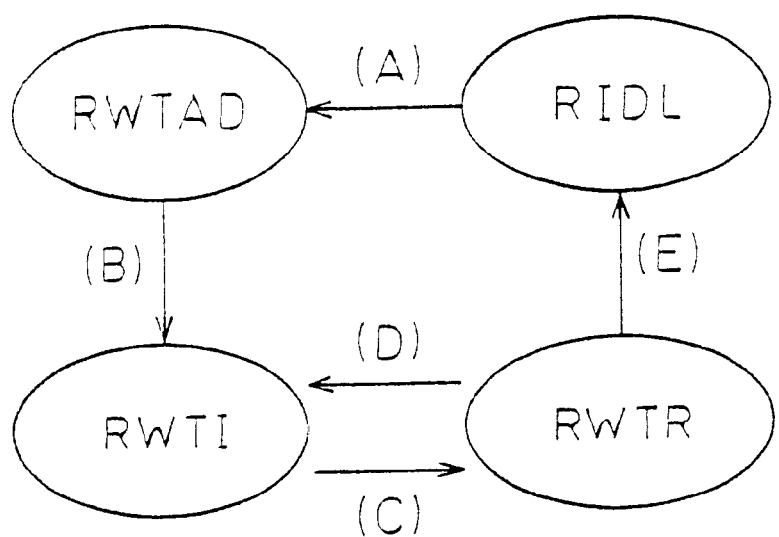
FIG. 4 is a diagram showing the transition of access states in a replace control.

Here, referring to FIG. 4, the transition of access states to be stored in the "RDY" field of the queue 31 will be described.

The access states are four states such as RIDL, RWTAD, RWTI and WTR:

RIDL designates a state in which the entry has been accessed to see whether or not a command is invalid;

RWTAD designates a state in which the command to the entry is valid and the calculation of an address for access is completed (the "AV" is ON), or in writing, write data (the "DV" is ON) is waited;

RWTI designates a state in which the command to the entry is valid and the issuance of an access is waited; and RWTR designates a state in which a reply from the primary cache memory is waited.

As shown by arrows with reference characters (A) to (B) in FIG. 4, the transition conditions are as follows:

(A) The queue entry is selected by a load store instruction issued from the instruction issuing unit 2;

(B) The address is calculated and AV is turned on (if in writing, the "DV" is turned on);

(C) The queue entry is selected as an access, and the access is issued to the primary cache;

(D) A rewrite response is received for the issued access from the primary cache; and (E) A "valid miss" response is received for the issued access from he primary cache.

Figure 5:
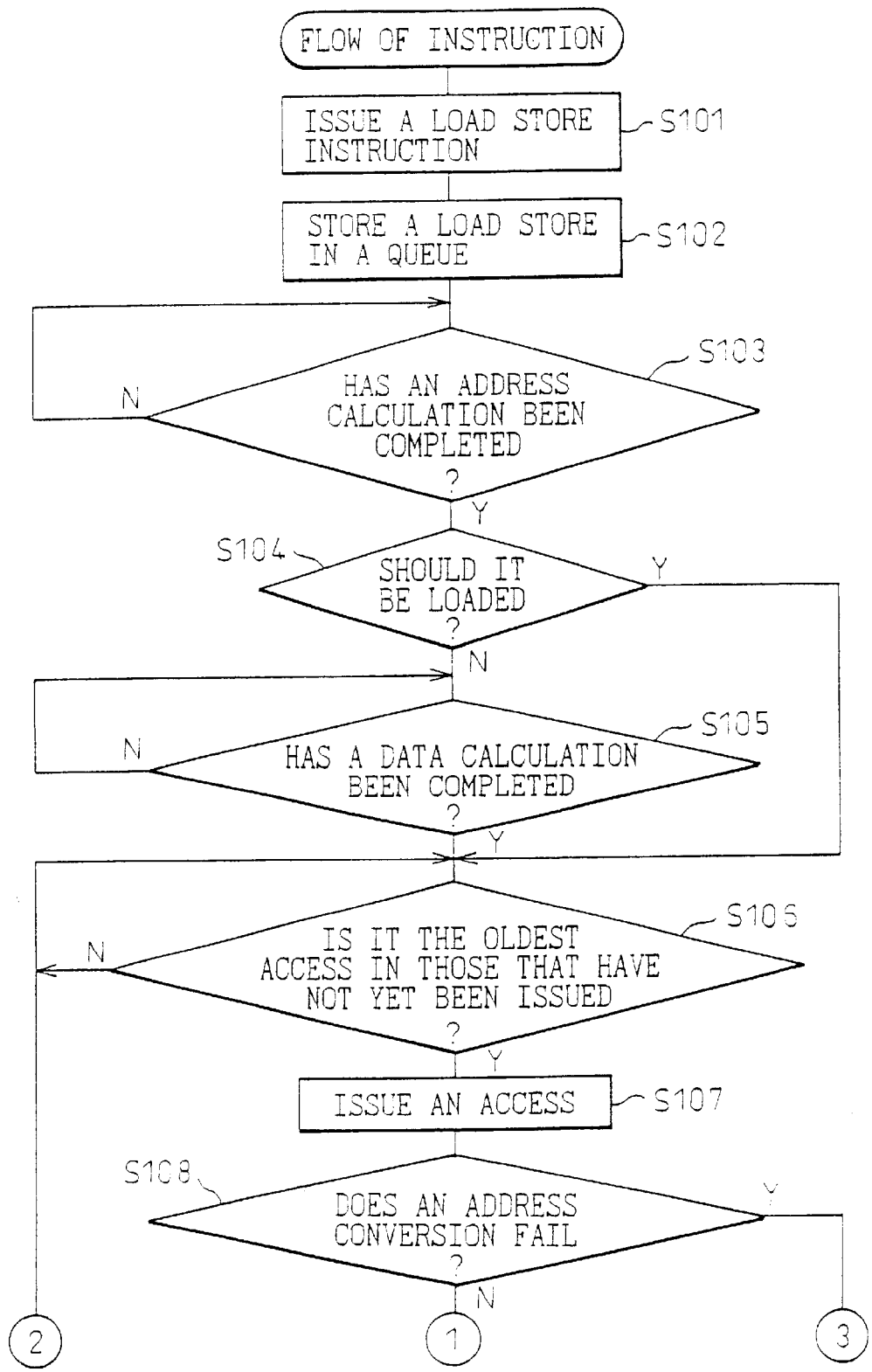
FIG. 5 is a flowchart showing the flow of a replace control process under an in-order control.
Figure 6:
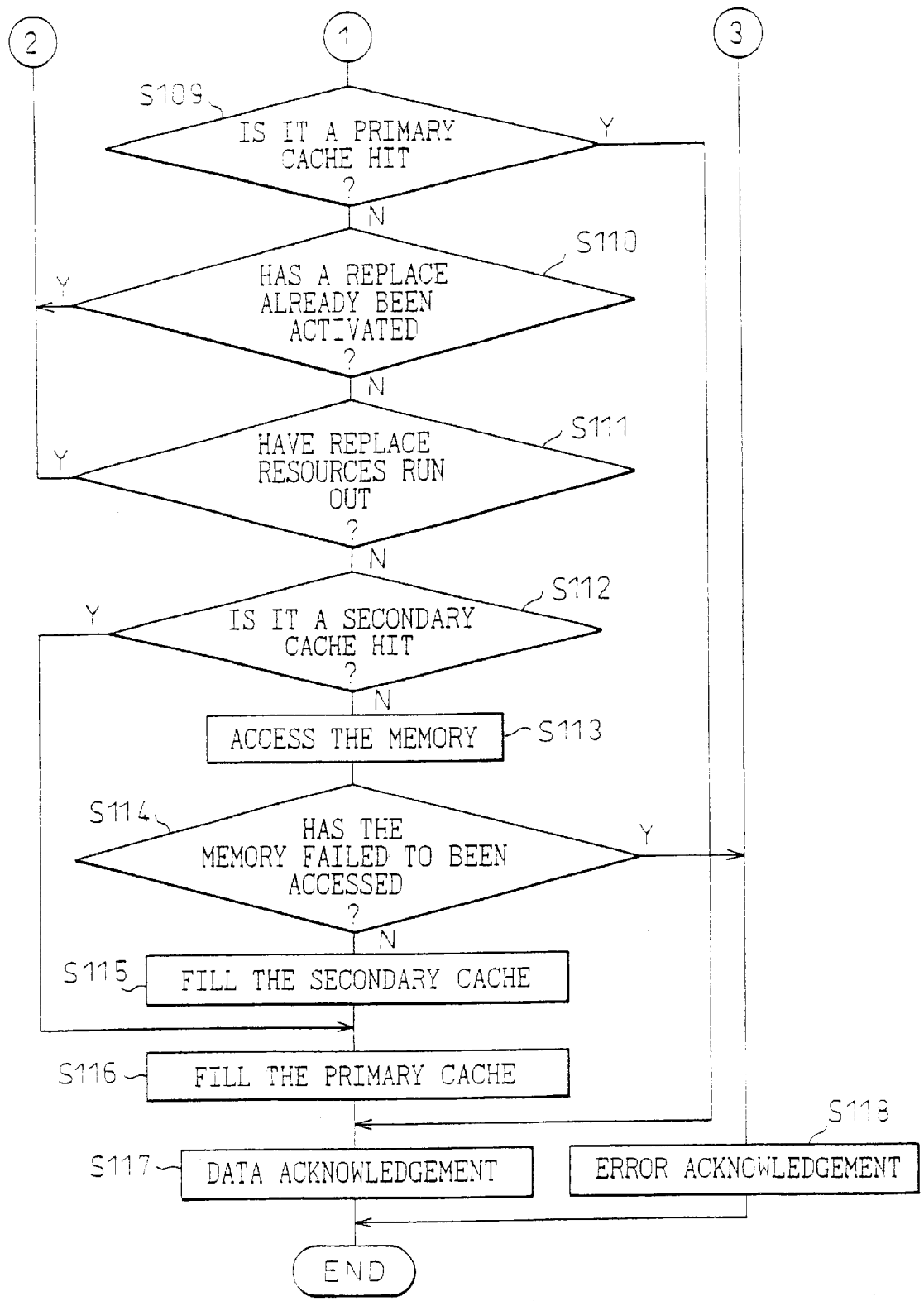
FIG. 6 is a flowchart showing further the flow of the replace control process which follows the flowchart in FIG. 5.

Next, referring to flowcharts in FIGS. 5 and 6, described below will be the operation of the load store unit 4 in the in-order control, the access to the primary cache 5 and a replace control. FIGS. 5 and 6 show flowcharts for processing for common load store. First of all, a load store instruction is issued from the instruction issuing unit 2 (step S101).

When the load store instruction is issued, the storing destination selection logic 35 in the reservation station 3 operates to thereby store the load store in the queue 31 (step S101), and following this, the address of the load store is calculated (step S103).

When the calculation of the address is completed (Y), a discrimination is made between the load instruction and the store instruction, and if it is the store instruction (N), the completion of calculation of store data is waited on the queue(step S105).

In order to issue an instruction at this stage in the in-order control, entries of the access queue are determined on their age, and the oldest entry is selected (step S106). Here, it is determined if there exists an instruction which has already been issued but not yet completed.

If there remains an incomplete instruction (N), the completion of the instruction is enqueued. If there remains no incomplete instruction (Y), an access to the primary cache 5 is issued (step S107).

Here, in the event that the hierarchies of the load store unit 4 and the primary cache 5 are constituted by logical or physical spaces and are different, the access address to the primary cache 5 has to be converted into a logical address or a physical address. However, since there is a case where an error occurs during the conversion, whether or not there is occurring an address conversion error is determined when issuing an access (step S108).

If there is occurring a conversion error (Y), an error response is made and the instruction ends (step S118).

On the contrary, if there is occurring no conversion error (N), since an access is issued, the primary cache 5 is accessed, and the primary cache is retrieved (step S109). If a hit occurs the cache (Y), a data acknowledgement is sent back (step S117), and the instruction ends.

If there occurs a miss to the cache (N), whether or not a replace has been activated is determined (step S110), and when it is determined that the replace has already been activated (Y), the flow returns to step S106, and a retry is designated to the load store unit 4. The load store unit 4 restarts the determination on the oldness of the entries and re-executes the same process.

In addition, there exists another factor to be considered when designating the retry. It is a resource starvation resulting from replacing the primary cache 5 (step S111). In the event that there occurs a resource starvation (Y), the flow returns to step S106, and the retry is designated to the load store unit 4.

On the contrary, if there occurs no resource starvation (N), the secondary cache 6 is indexed (step S112).

Here, if a hit occurs to the secondary cache (Y), after the data is registered to the primary cache 5 (step S116), a data acknowledgement is sent back (step S117), and the process ends.

In addition, if a miss occurs to the secondary cache in step S112 (N), a memory access is activated.

When the memory 7 is accessed, it is determined whether or not there has occurred an access error (step S114). If it is determined that there has occurred an access error (Y), an error response is made, and the process ends (step S118). As this occurs, the cache state is put in a nullified state.

If there has occurred an access error (N), data is fetched from the memory 7 so that the data is registered in the secondary cache 6 (step S115).

Furthermore, the data registered in the secondary cache 6 is then registered in the primary cache 5 (step S116). Then, there, a data acknowledgement is sent back (step S117) and the process ends.

Thus, what has just been described heretofore is the load store process flow in the normal in-order control.

However, there is another system for concealing a latency miss. In the system, in the event that there occurs a miss to a cache, an address where the next cache miss is likely to occur is predicted, and the cache is retrieved. In the event that there occurs a miss to the cache, a replace control is then carried out. In this simplest method of prediction, there is a system in which once there occurs a miss to the cache, it is predicted that a miss also occurs to the next cache line.

Figure 7:
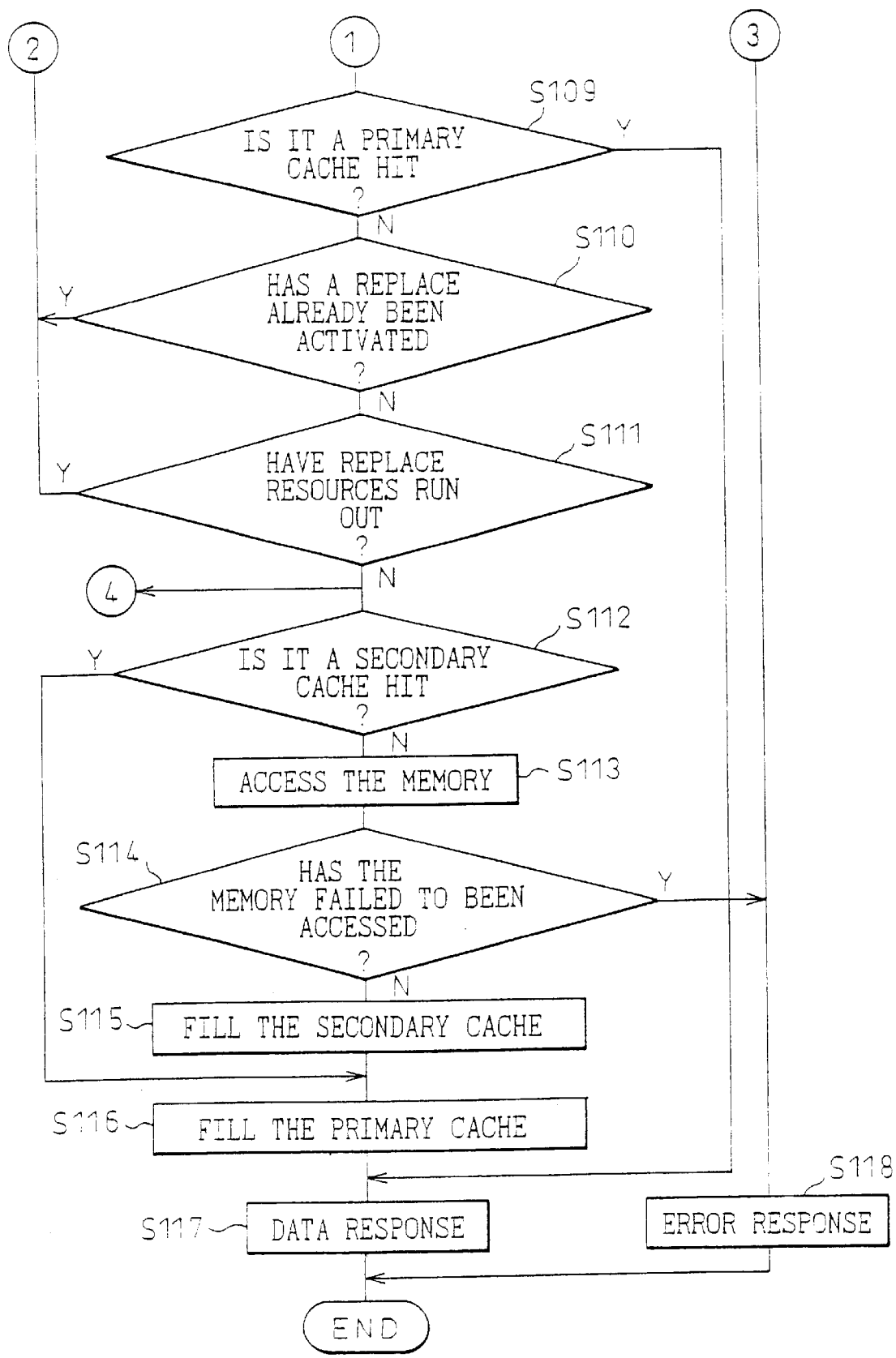
FIG. 7 is a flowchart showing the flow of a replace control process to which a next line replace control based on the prediction of a cache miss is added.
Figure 8:
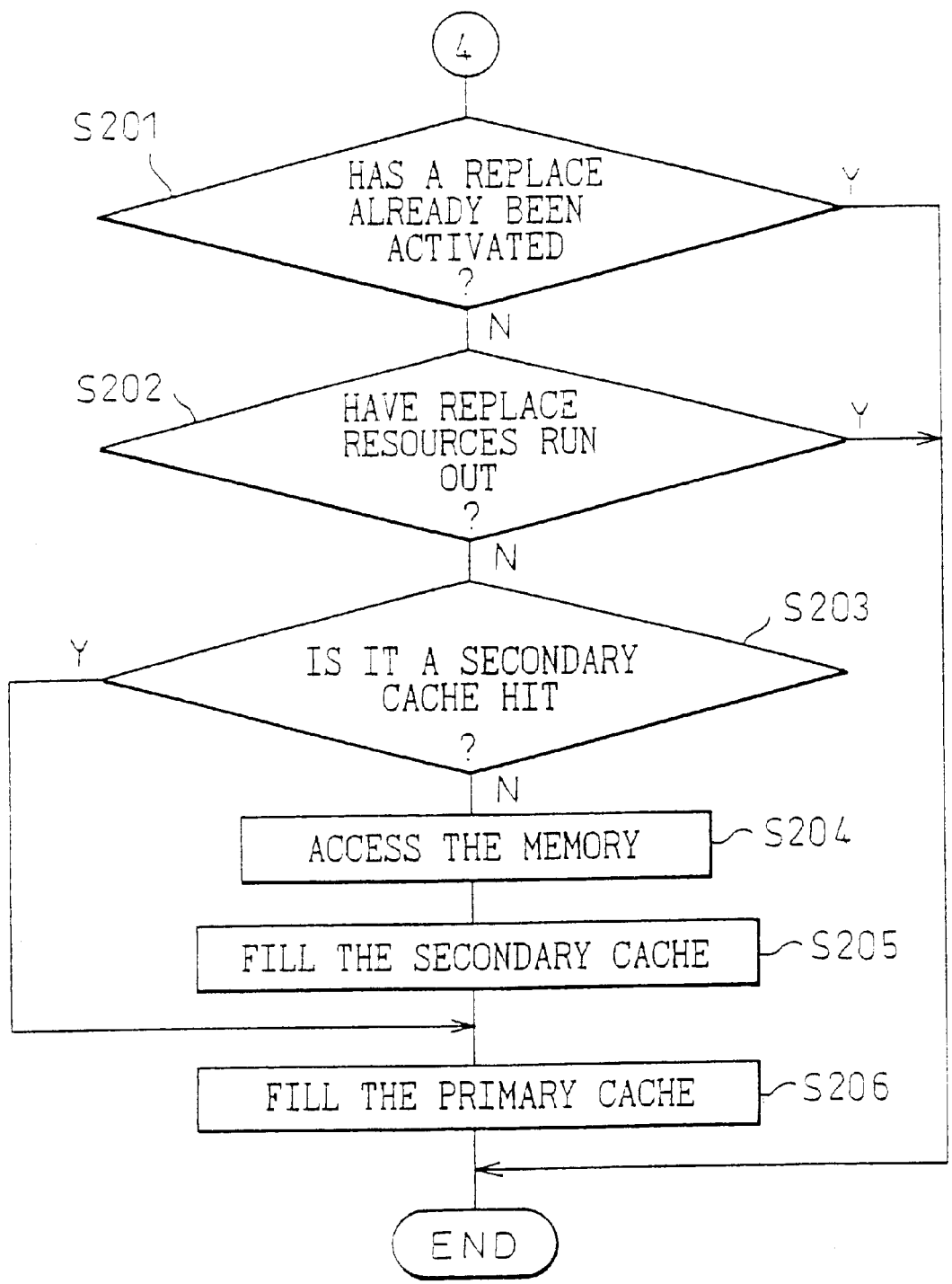
FIG. 8 is a flowchart showing further the flow of the replace control process which follows the flowchart in FIG. 7.

Referring to FIGS. 7 and 8, the operation and process of the system will be described.

Even in this system, the system configuration shown in FIGS. 1 to 3 is used, and the fundamental process flow is similar to that shown in FIGS. 5 and 6. Due to this, the process flow shown in FIG. 5 is omitted and not shown in FIG. 7. However, even in the process flow shown in FIG. 7, steps like those used in FIG. 6 are given like reference numerals.

The process flow shown in FIG. 7 differs from that shown in FIG. 6 in that in the former process flow, after it is determined in step S111 whether there exists the starvation of replace resource, the next address miss is predicted at the same time the secondary cache 6 is accessed in step S112, so that a replace control is executed for the next cache line.

A flow shown in FIG. 8 will be referred to when describing the process flow of a line replace control which is to be operated simultaneously and in parallel with the process flow in FIG. 7.

Basically, the process flow of the line replace control, which is configured to operate in parallel with the process flow of the replace control shown in FIG. 7, is similar to the process flow of that replace control of FIG. 7. Steps S201 to S206 shown in FIG. 8 correspond, respectively, to steps S110 to S116 shown in FIG. 7.

However, while in the process of the replace control in FIG. 7, the data is registered in the primary cache 5 in step S116, and thereafter, the data response is made in step S117, in the line replace control in FIG. 8, which operates in parallel, if data is registered in the primary cache 5 in step S206, no further process is required, and the process ends thereafter.

With this process configuration, in a case where misses continuously occur to the primary cache, since a replace control is carried out by assuming another access and predicting another miss in the following cache line, the cache miss latency can be reduced.

Next, the cache-controlling device which performs a replace control according to the present invention, in which a latency at the time of occurring of cache miss is improved, is explained.

In an embodiment of the present invention, when a memory access is on a queue waiting for a certain condition, it is controlled such that a pre-access is issued prior to a proper execution of a memory access by determining the occurrence of a hit to the cache and defining an exclusive cache access for activating a replace operation when a miss is occurring to the cache. If there occurs a miss to the cache, a replace control can be activated prior to the establishment of a proper execution. Thus, it is possible to attain an in-order control which has the performance of the out-of-order control and is free from program limitation.

Referring to FIGS. 9 to 16, the embodiment of the present invention will be described.

Similar to the aforesaid prior art, the embodiment of the present invention is designed to be applied to the part of the system configuration of the hardware of the computer shown in FIG. 1 which part is designated by the broken line. Here, similar hardware is used, and therefore, the description of the relevant system configuration will be omitted.

Figure 9:
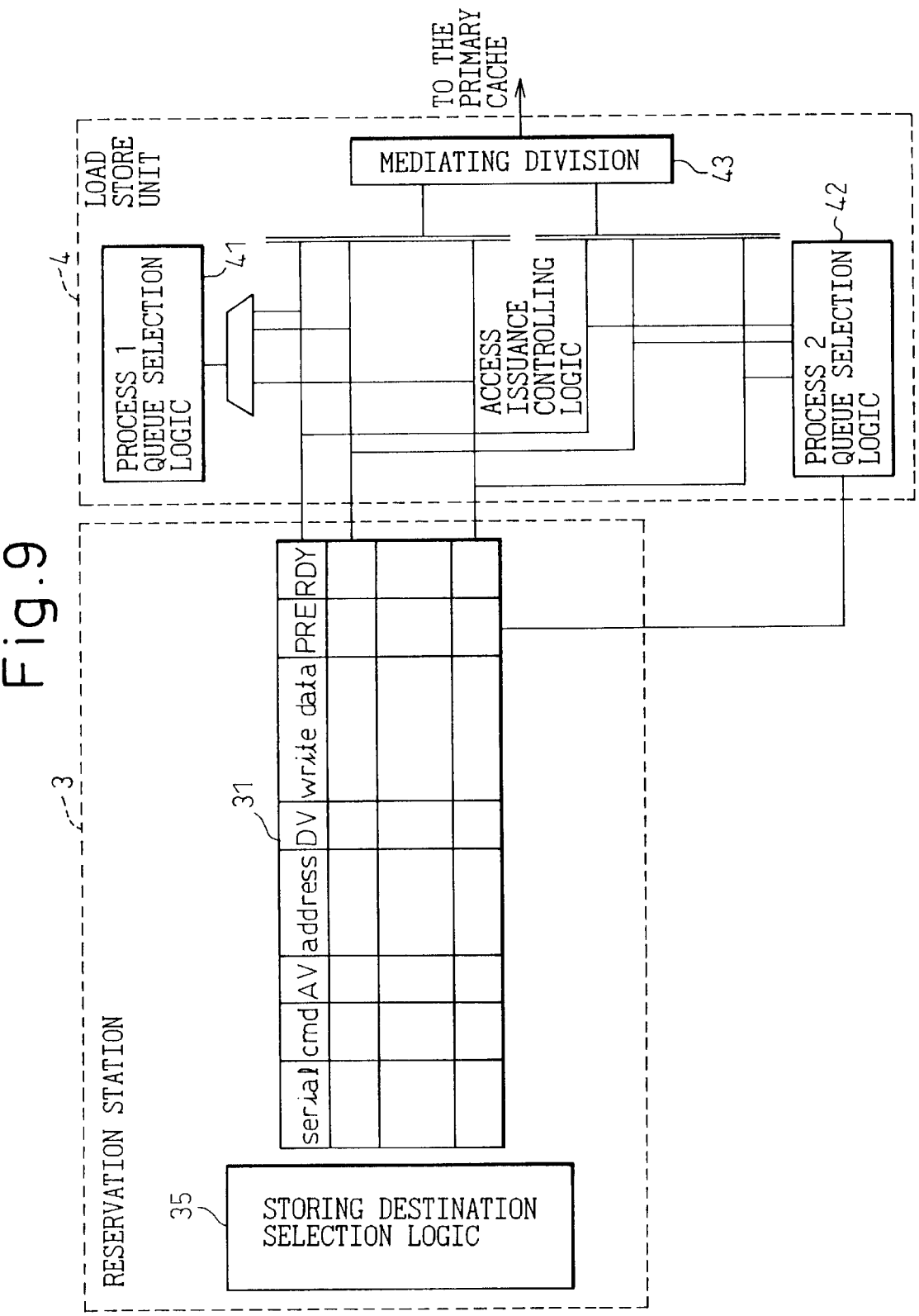
FIG. 9 is a diagram showing the system configurations of a reservation station and a load store unit according to an embodiment of the present invention.

FIG. 9 is a block diagram of a circuit resource showing the system configurations of a reservation station 3 and a load store unit 4 according to the embodiment of the present invention. The system configurations shown in FIG. 9 show the reservation station 3 and the load store unit 4 residing in the part of the computer shown in FIG. 1 which part is designated by the broken line.

The reservation station 3 and the load store unit 4 are similar to those shown in FIG. 2 which shows the prior art, and like reference numerals are given to like portions. The reservation station 3 has a queue 31 and a storing destination selection logical circuit 35 for controlling the storage to the queue 31, and the same station has no difference in configuration from the reservation station 3 in FIG. 1. However, when comparing the load store unit 4 with its counterpart shown in FIG. 2, a process 2 queue selection logical circuit 42 is added to an access issuance control logical circuit.

When comparing with the entry fields of the prior art queue 21 in FIG. 2, the queue 31 in FIG. 9 is characterized in that an entry field is added which indicates the state of a pre-access of "PRE." Apart from this, the queue 31 is similar to the prior art queue 31 in FIG. 2 in that the queue 31 is controlled by a ring construction, as well as a storing pointer register and a pointer for fetching instructions for issuing an in-order access, constitutes an FIFO configuration and holds respective fields such as "serial," "cmd," "AV," "address," "DV," "write data," and "RDY." Thus, the description of the features of the embodiment similar to those of the prior art example will be omitted here.

In addition, while the storing destination selection logical circuit 35 of the embodiment is similar to the storing destination selection logical circuit 35 in FIG. 2, in the embodiment, when an instruction is put by the instruction issuing unit 2 into the relevant queue, the "serial" and "cmd" are stored in queue entries designated by the pointer to thereby perform the state transition of the "PRE" and "RDY."

Furthermore, the load store unit 4 according to the embodiment of the present invention differs from the prior art load store unit 4 shown in FIG. 2 in that while the latter load store unit is provided with the queue selection logical circuit 41 only, the former load store unit 4 has, in addition to a process 1 queue selection logical circuit 41, the access issuance control logical circuit 41 comprising the process 2 queue selection logical circuit 42.

In the embodiment, two types of accesses, an access and a pre-access, are prepared for issuance of accesses. The access is a normal primary access, while the pre-access is a cache reference for activating a replace control prior to a miss occurring to the primary cache or misses to the primary and secondary caches.

The direction of selecting entries issued from the queue 31 becomes different for the access and pre-access. The selection of entries for the access is directed to the in-order control, while for the pre-access there is provided no particular strong requirement with respect to the access order and therefore, the selection is directed to select older entries that can be issued at a certain time. Due to this, the load store unit 4 comprises the process 1 queue selection logical circuit 41 and the process 2 queue selection logical circuit 42 as two selection logical circuits which follow the aforesaid directions.

Next, the load store unit 4 is provided with a mediating division 43 for mediating entries selected by the two selection logical circuits, and the primary cache memory 5 is referred to via the mediating division 43. The mediating division 43 holds a logic in which in a case where two accesses become valid for the process 1 queue selection logical circuit and the process 2 queue selection logical circuit in the same clock, the access for the process 1 queue selection logical circuit is selected.

Furthermore, although the primary cache memory and the secondary cache memory are not shown in FIG. 9, a primary cache memory 5 and a secondary cache memory 6 which are similar to those shown in FIG. 3 are connected to a system memory 7. In the secondary cache memory 6, four replace control resources 0 to 3 can be operated in parallel with each other. The resources 0 to 3 are activated by cache misses in the access and pre-access.

In a case where a succeeding access is issued to an address which is already in activation, a designation of retry is provided. On the contrary, in a case where a pre-access is issued, a normal response is made, and the normal response is made with data remaining invalid.

However, allocating all the four replace control resources 0 to 3 for pre-accesses triggers the starvation of resources for accesses, and therefore, the allocation to the pre-access is limited. The number m of resources for use for the pre-access relative to the number n of resources is set as m<n, and for example, m is set m=2.

Limiting the number of resources for use for the pre-access may raise a risk that a pre-replace control is not accepted, however, if it is configured such that a request for re-access is generated for an accepted pre-replace control, the risk can be dealt with properly.

Figure 10:
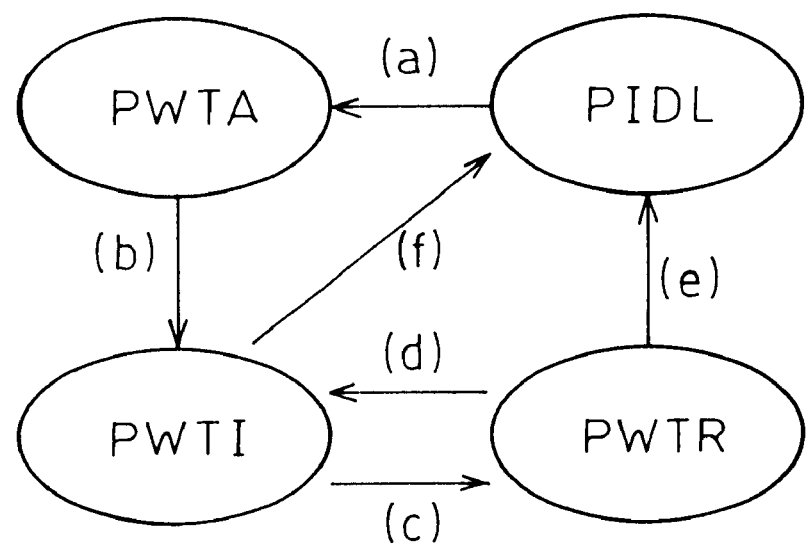
FIG. 10 is a diagram showing the transition of pre-access states in a replace control according to the embodiment of the present invention.

Next, described while referring to FIG. 10 will be the state of a pre-access that can be taken at the entry field "PRE" of the queue 31.

There are the following four states for the "PRE" showing the state of the pre-access.

PIDL designates the validity of a command to the entry, as well as the completion of issuance of a pre-access.

PWTA designates a state in which a command to the entry is valid and the completion of address calculation for a pre-access is waited on the queue.

PWTI designates a state in which the command to the entry is valid and the issuance of a pre-access is being waited.

PWTR designates a state in which a reply from the primary cache memory is waited on the queue.

Transition conditions for these states are shown by arrows with reference characters a to f in FIG. 10, the respective reference characters denoting the conditions as follows.

(a) The queue entry is selected by issuing a load store instruction from the instruction issuing unit.
(b) The "AV" flag becomes on.
(c) The queue entry is selected as a pre-access and is then issued to the primary cache.
(d) A retry response is received from the primary cache for the issued pre-access.
(e) A valid response is received from the primary cache for the issued pre-access.
(f) The "RDY" has transitioned to RIDL (since the issuance of the access is successful, no pre-access is required.)

Next, described below while referring to flowcharts shown in FIGS. 11 and 12 will be an operation flow of the in-order control for issuing access and pre-access in a replace control according to the embodiment of the present invention.

Here, as is described above, while a primary access to the cache memory and a pre-access configured to be precede issued for activating the replace control prior to a miss occurring to the primary cache memory or misses occurring to the primary and secondary cache memories are prepared in the replace control according to the embodiment, the operation flow of the replace control when the primary access is issued is the same as the operation flow shown in FIGS. 5 and 6. Due to this, in FIG. 11, like reference numerals are given to like steps. In addition, step S107 in FIG. 11 is understood to follow step S108 in FIG. 6.

First of all, a load store instruction is issued from the instruction issuing unit 2 (step S101).

When the load store instruction is issued, the storing destination selection logical circuit 35 of the reservation station 3 operates to thereby store the load store in the queue 31 (step S102), and an address for the load store is then calculated (step S103).

Here, at the point (Y) of completion of the calculation for address, the operation process flow is divided into two flows for parallel operation. Namely, they are a process 1 for a primary access and a process 2 which is newly provided for activating a pre-access which is a feature of the embodiment of the present invention.

In the process 1, when the calculation of an address is completed (Y), it is determined whether the instruction issued is a load instruction or a store instruction (step S104). In the event that it is determined as the store instruction (N), the completion of calculation of store data is queued (step S105). Steps following the step S105 are similar to the respective steps illustrated in FIGS. 5 and 5, and therefore, the description thereof will be omitted.

On the other hand, since the process 2 is performed in parallel with the process 1, it is determined whether the primary access has already been activated in the process 1(step S301). In the event that the primary access has already been activated (Y), since there is no need to carry it out, the process 2 ends.

On the contrary, in the event that the access has not yet been activated (N), an oldest entry of entries holding pre-accesses is selected (step S302). In the event that the selected entry is not the oldest one, then holding the issuance of a pre-access, the flow returns to step S301.

In the event that the selected entry is the oldest one, then the issuance of a pre-access is attempted (step S302).

If it is the case, then, a mediation needs to be carried out between the pre-access and the primary access. The mediation is carried out at the mediating division 43 of the load store unit 4 (step S303). According to the mediating direction, in the event that the two accesses compete with each other (Y), the priority is granted to the primary access. Due to this, the issuance of the pre-access is held and the flow returns to step S301.

The issuance of the pre-access which is once held is re-tried. Such a retry is carried out whether or not the primary access has already been activated has been determined.

In the event that the pre-access can be issued as the result of a mediation (N in step S303), then the pre-access is issued (step S304).

Here, due to a problem with the hierarchies of cache memories, the access address to the primary cache 5 has to be converted to a logical address or a physical address. However, since there may a case where there occurs an error in conversion, when the pre-access is issued, it is determined whether or not there occurs an address conversion error (step S305).

If there is a conversion error (Y), the pre-access ends.

On the contrary, if there is no conversion error (N), the pre-access is issued, and the primary cache 5 is accessed (step S306). As this occurs, in the event that a hit occurs to the cache (Y), data is registered in the primary cache 5, and since there exists no problem, the process 2 ends.

When the pre-access is issued with the primary cache 5 being indexed, in the event a miss occurs to the cache (N), it is verified whether or not a replace control has already been activated (step S307). In the event that the replace control has already been activated (Y), since this pre-access is not required, the process 2 ends.

On the contrary, in the event that the replace control has not yet been activated (N), the starvation of replacing resources is determined (step S308). In the event that the replacing resources are running out (Y), the flow returns to step S301 so as to perform the aforesaid retry.

On the contrary, in the event that the replacing resources are not running out (N), the secondary cache 6 is indexed (step S309). Here, if a hit occurs to the cache (Y), the data in the secondary cache 6 is registered in the primary cache 5 (step S313), and the process 2 ends.

However, in step S309, in the event that a miss occurs to the secondary cache (N), an access is activated to the system memory 7 (step S310).

Then, when the memory 7 is accessed, it is determined whether or not there occurs an access error (step S311). If there occurs an access error (Y), the process ends in that state.

Here, if there occurs no access error (N), the data is fetched from the system memory 7 so as to be registered in the secondary cache 6 (step S312). Furthermore, the data is registered in the primary cache 5 (step S313), and the process 2 ends.

Thus, since it is configured such that the pre-access is activated in parallel with the primary access, in the process 1, in the event that a miss occurs to a certain cache, the cache is pre-replaced in the process 2 for a succeeding access to thereby allow a hit to occur to the replaced cache. In addition, after a certain access is completed, the succeeding access is re-executed, and in the process 1, a hit occurs to the cache or a replacing control is already in activation.

Note that, as the result of activating manipulation of a replace control, the access is kept incomplete. The sequence can be held by configuring such that the access is normally issued when the queuing condition is released and that a normal response is made to the access. The normal issuance has to be effected in the in-order control. Since the band width of the cache is used at a higher level while normal instructions so issued continue to hit the cache, the pre-access instead wastes the band width of the cache. Due to this, the pre-access generates a cache miss, and the pre-access is configured so as to be issued using a time while a response is being waited.

In addition, while the process 1 and the process 2 have been described as being carried out exclusively in the process flow in the aforesaid embodiment of the present invention, it is possible to have wide variations on the mediation by the mediating division 43 and the process flow by making a tag division 51 of the primary cache 5 comprise a multiplicity of ports or hashing the tag division 51 with addresses so as to make the division virtually comprise a multiplicity of ports.

Figure 11:
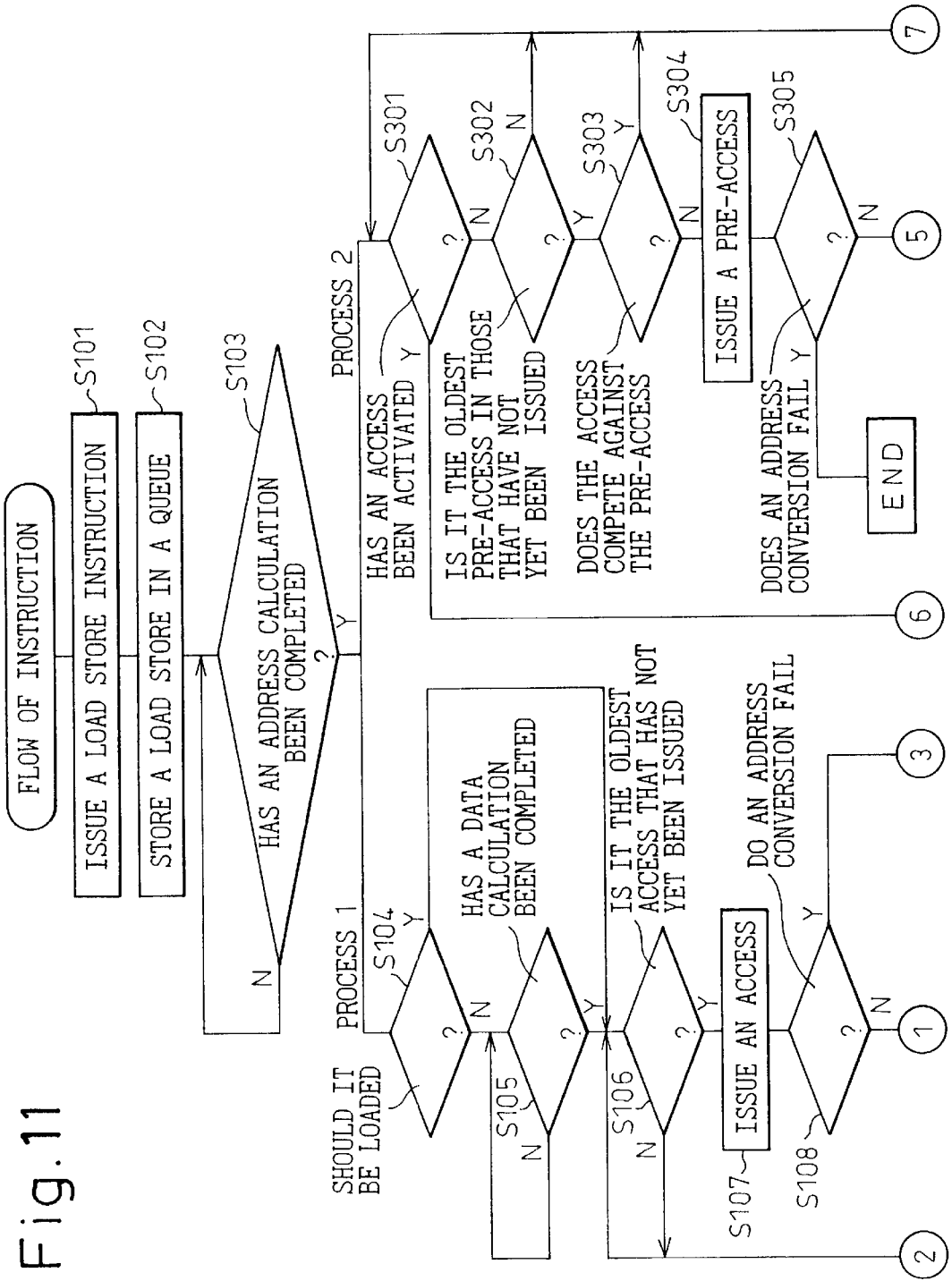
FIG. 11 is a flowchart showing the flow of a replace control including a pre-access according to the embodiment of the present invention.
Figure 12:
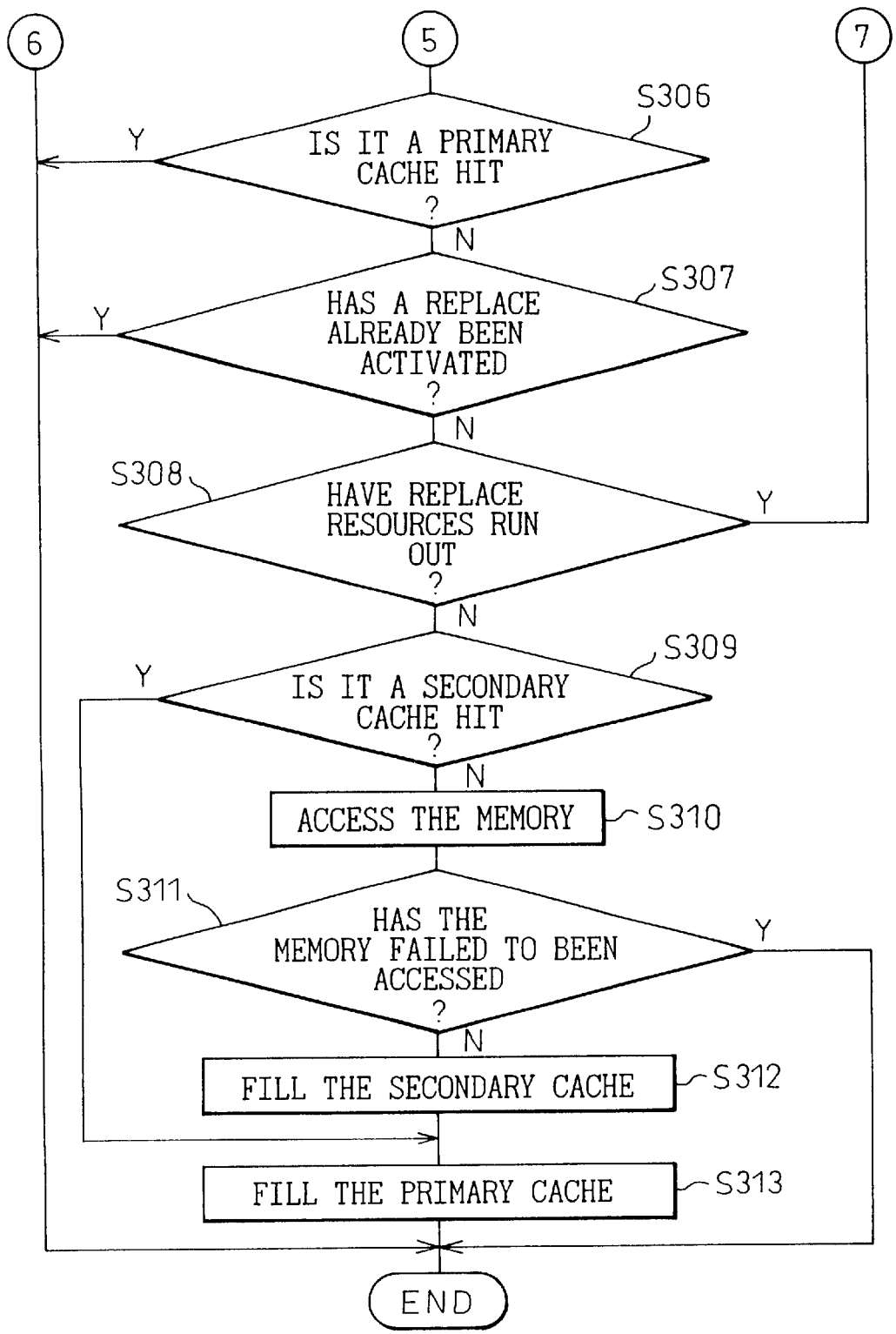
FIG. 12 is a flowchart showing further the flow of the replace control which follows the flowchart in FIG. 11.
Figure 13:
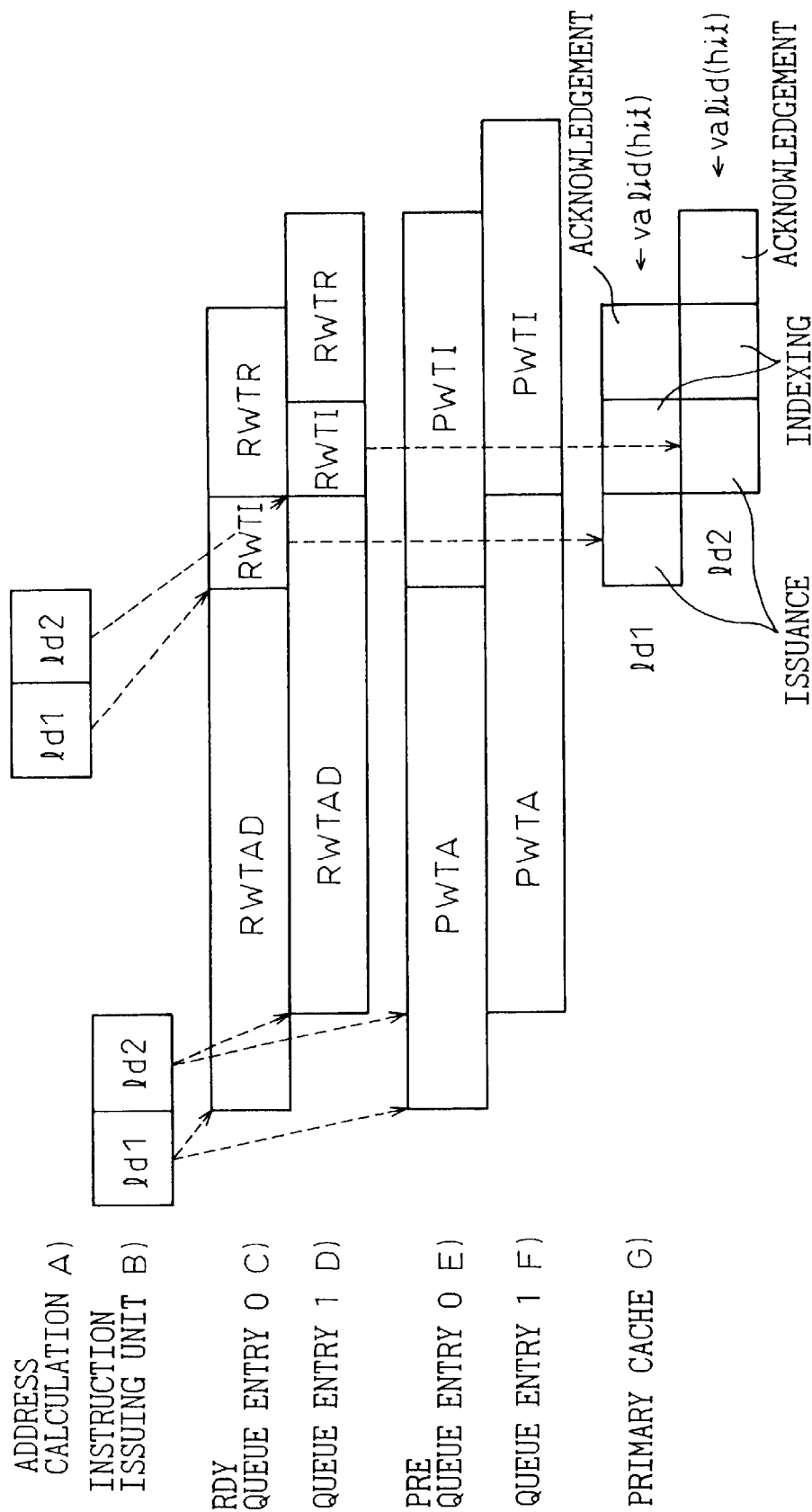
FIG. 13 is a timing chart showing specific timings of access states at which hits continuously occur to a cache.
Figure 14:
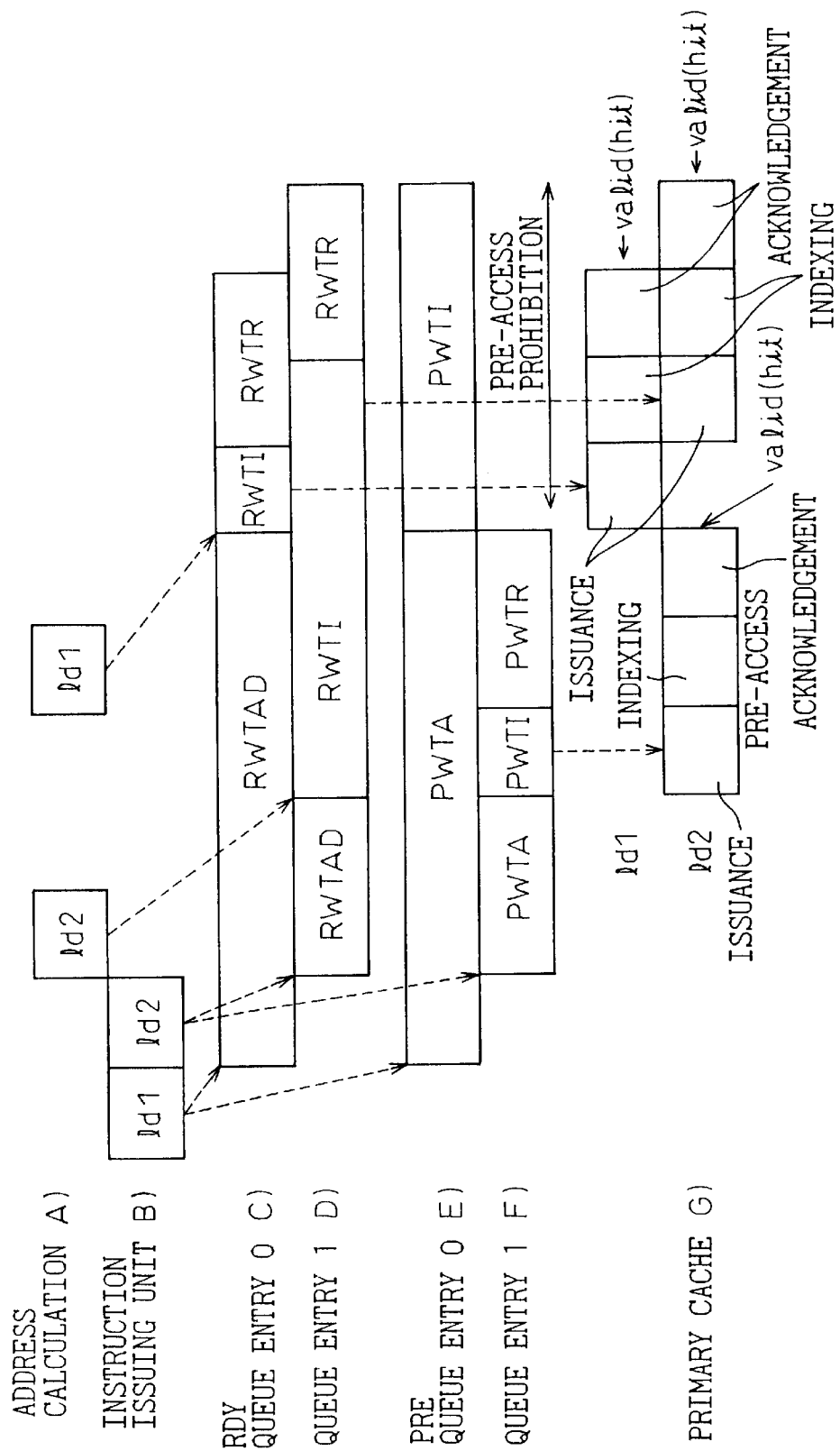
FIG. 14 is a timing chart showing specific timings of access states at which hits continuously occur to a cache when there exists a pre-access.
Figure 15:
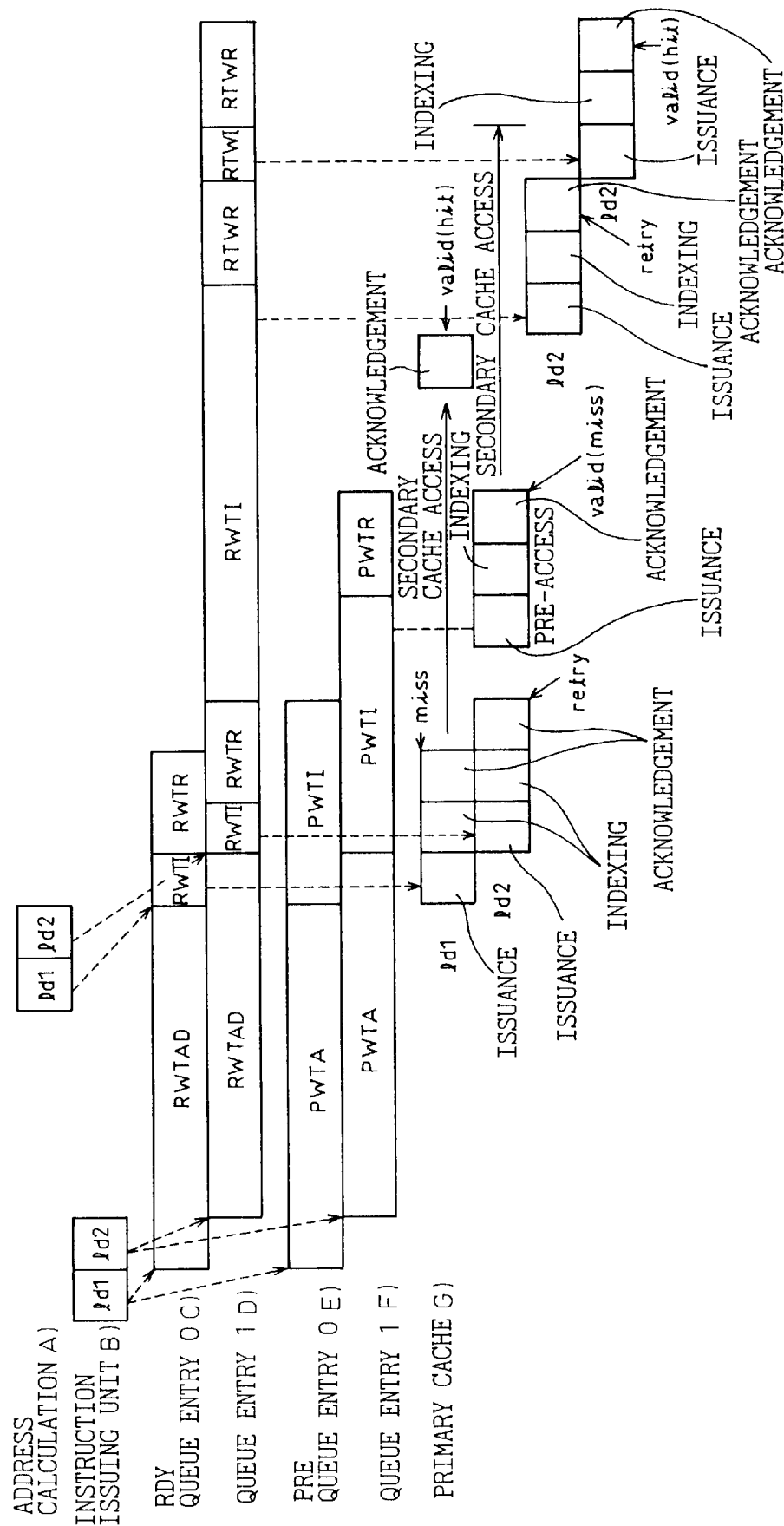
FIG. 15 is a timing chart showing specific timings of access states at which misses continuously occur to a cache.

Next, in FIGS. 13 to 15 timings are illustrated as being divided into various cases with respect to the specific example of access through the process flow shown in FIGS. 11 and 12.

Shown in FIGS. 13 to 15 are an address calculation completion timing A), an instruction issuing timing B) of the instruction issuing unit 2, transitions C) and D) of states of queue entries of "RDY" of the queue 31, transitions E) and F) of queue entries of "PRE" and operation timings of the primary cache 5, and clock units are represented along the axis of abscissa.

Those diagrams show cases of two continuous loads ld1, ld2, and queue entries of the "RDY" and "PRE" use 0, 1 and corresponds to C) and D), and E) and F), respectively, in the figures.

FIG. 13 shows a case where in-order controls have been completed after address calculations, and hits have continuously occurred to the cache.

When load instructions ld1, ld2 are issued from the instruction issuing unit, in the states of the queue entries of "RDY" the state of RWTAD is set in the queue entries 0 and 1, respectively, at timings which deviate from each other by one clock, corresponding to ld1, ld2, and similarly, in the states of the queue entries of "PRE" the state of PWTA is set in the queue entries, respectively, at timings which deviate from each other by one clock.

When the address calculations are completed for ld1, ld2, the states of entries 0 and 1 of "RDY" are caused to transition to RWTI, respectively, at timings which deviate from each other by one clock. Accesses of ld1 and ld2 to the primary cache are then issued sequentially at the timings of transition to RWTI. Thereafter, the queue entries 0 and 1 transition to RWTR.

Next, indexing is carried out at the primary cache, and when a hit occurs to the cache, a data acknowledgement is sent back.

On the other hand, at "PRE," the entries transition from PWTA to PWTI at timings address calculations of ld1, ld2 are completed, however, since when ld1 and ld2 gain access to the primary cache, hits occur to the cache, there exists no timing when a pre-access is issued.

In addition, FIG. 14 shows a case where out-of-order controls have been completed after address calculation and hits continuously occur to the cache. The way of displaying timings in FIG. 14 is similar to that in FIG. 13.

However, while the address calculations are completed continuously due to the in-order controls in FIG. 13, in FIG. 14, due to the out-of-order controls, the timings of completion of address calculations of ld1 and ld2 differ from each other, and the timing the address calculation of ld1 is completed occurs earlier by a few clocks than the timing the address calculation of ld2 is completed.

First of all, when load instructions ld1, ld2 are issued from the instruction issuing unit 2, in the states of the queue entries of both "RDY" and "PRE" RWTAD and PWTA are similarly set in the queue entries 0 and 1, respectively, corresponding to ld1, ld2.

The state of the queue entry 1 of "RDY" corresponding to ld1 is caused to transition from RWTAD to RWTI. As this occurs, since a pre-access is configured to be activated in parallel, the state of the queue entry of "PRE" is also caused to transition from PWTAD to PWTI. Furthermore, an access to the primary cache 5 for the pre-access is issued, and as the result of indexing, a hit occurs to the cache.

However, here, since the hit is caused by the pre-access, no data response needs to be made. Then, for example, in the case of read access, it may be configured such that at the origin of issuance no data response occurs or the use of data so hit is ignored. Furthermore, in this case, making a response or transferring data can be suppressed through cache control. In addition, even in the case of write access, as with the read access, it is possible to configure such that no data response is made.

Next, when an address calculation of ld1 is completed later than ld2, the state of the queue entry 0 of "RDY" corresponding to ld1 transitions from RWTAD to RWTI, and an access to the primary cache 5 is issued. After this access is issued, issuing a pre-access is prohibited by the mediating division 43.

When an access is issued to the primary cache 5 by ld1, as the result of indexing, a hit occurs to the cache and a data acknowledgement is sent back. Then, an access to the primary cache 5 by ld2, which is queued, is issued at the timing the state of the queue entry 0 of "RDY" corresponding to ld1, and as the result of indexing, a hit occurs to the cache, and a data acknowledgement is sent back. Furthermore, the state of the queue entry 1 of "RDY" corresponding to ld2 transitions from RWTI to RWTR.

On the other hand, at the queue entry 0 of "RTY" for ld1, even if an address calculation of ld1 is completed and the state thereof is caused to transition from PWTA to PWTI, since the access of ld1 is already activated, no pre-access is activated.

In the case shown in FIG. 14, although the issuance of the pre-access is described as being allowed as the address is known in advance, due to the cache hit, the occurrence of hit to the cache by the pre-access was not needed. However, since it is such that is configured to be issued within an empty space of the primary access, this unnecessary access constitutes no demerit in performance.

Next, FIG. 15 shows a case where in-order controls have been completed after address calculations, and misses occur continuously to the cache. The way of displaying timings in FIG. 5 is similar to those in FIGS. 13 and 14.

In FIG. 15, however, although an access of ld1 to the primary cache 5 is issued at a timing the calculation of an address for ld1 is completed, as the result of indexing the primary cache 5, a miss occurs to the cache. This further issues an access to the secondary cache 6.

In addition, when the calculation of an address for ld2 is completed following the address calculation for ld1, an access of ld2 to the primary cache 5 is issued. As this occurs, since the access of ld1 fails to hit the cache with a replace control having been activated, a designation of retry is issued by the load store unit 4.

However, this is a designation of retry to the ld2, and it is possible to activate a pre-access through mediation by the mediating division 43. Then, a pre-access for ld2 is issued, and the primary cache 5 is indexed, but here, too, a miss occurs to the cache, and an access is further issued to the secondary cache 6.

In contrast, when a hit occurs to the cache in response to the issuance of the access to the secondary cache 6 for ld1, then, data is registered in the primary cache 5, and a data acknowledgement is sent back. An access of ld2 to the primary cache 5 is issued at that timing, and the state of the queue entry 1 of "RDY" for ld2 transitions from RWTI to RWTR. However, since the access of ld2 to the secondary cache 6 is still in activation at this timing, the load store unit 4 issues a designation of retry of the access of ld2 to the primary cache 5.

Here, when a hit occurs to the cache in accessing to the secondary cache 6 for ld2 which is previously activated, the hit data is registered in the primary cache 5. Then, the data response is not performed.

In the case of read access, for example, although a replace control is performed, a response or data response can be suppressed, and the response and data response may be suppressed by an exclusive command. Additionally, in the case of write access, too, a write or response can be suppressed through cache control, and they may be suppressed by an exclusive command.

Next, when this retry designation is issued, the state of queue entry 1 of "RDY" transitions from RTWR to RTWI, and an access of ld2 to the primary cache 5 is issued. Then, since the data registration in the primary cache 5 is completed by the pre-access of ld2, a data response can be made by indexing the primary cache 5 by the issuance of the access.

In the case shown in FIG. 15, ld1 causes a miss to occur to the cache, and ld2 is queuing for the completion of registration of the data of ld1. However, the pre-access is issued in the background thereof, and the parallel access to the secondary cache is designated.

Thus, the embodiment of the present invention has been described heretofore, and here operations of the control according to the embodiment of the present invention, in-order control and out-of-order control will be compared with each other taking the aforesaid cases A and B for example. All the operations are summarized together in FIG. 16.

In diagrams in FIG. 16, the axis of abscissa represents time. For example, to describe the meanings of the diagrams with respect to the case A in the in-order control, when an instruction a1 is issued from the load store unit 4, an access b1 to the primary cache 5 occurs. Then, here if a miss occurs to the cache, an access c1 to the secondary cache 6 occurs. A hit occurs to the secondary cache. Then, data is registered in the primary cache 5 from this secondary cache 6, and a data response d1 is made. Furthermore, a similar operation is repeated when the next instruction a2 is issued.

Here, observing the in-order control, there is no difference between the case A and case B, and there is no overlap of accesses, no request to the program being needed as a matter of course. Due to this, the configuration of the control circuit can be facilitated, but the performance becomes inferior.

It may be said that the out-of-order control is superior in performance, however, in the case A, there exists an overlap between two instructions, while in the case B, a member instruction is needed. Thus, the resources of the existing program cannot be utilized, and the configuration of the control circuit becomes difficult, a request to the program being required.

However, with the control according to the embodiment of the present invention, in both the case A and case B, even if an instruction a1 is issued, a pre-access can occur to an instruction a2 in the background as indicated by a broken line in the figure. Even if the pre-access of the instruction a2 fails to hit the primary cache, data has already been registered in the primary cache from the secondary cache by the time when the instruction a2 accesses to the cache. Thus, it is ensured that a hit occurs to the cache when the instruction a2 tries to gain access thereto. Furthermore, the instructions a1 and a2 can maintain an in-order relationship.

Furthermore, since accesses can overlap each other, a performance similar to that provided by the out-of-order control can thus be maintained, and such advantages are also provided that the control becomes relatively simple and no limitation is imposed to the program.

With the embodiment of the present invention, the performance is expected to be improved over the in-order control. Furthermore, the embodiment is advantageous over the out-of-order control in that the control circuit is easy to be configured and that there exists no limitation to the program.

Moreover, with the embodiment of the present invention, it is controlled such that when a memory access is queuing waiting for a certain condition, a pre-access is issued prior to a normal execution of the memory access by defining an exclusive cache access for determining whether or not a hit occurs to the cache and activating a replace operation when a miss occurs to the cache. If a miss occurs to the cache, a replace control can be activated before execution conditions are established, this leading to the reduction of the latency when a miss is occurring to the cache.

Thus, with the cache replace control according to the present invention, since it is controlled such that when a memory access is queuing waiting for a certain condition, a pre-access is issued prior to a normal execution of the memory access by defining an exclusive cache access for determining whether or not a hit occurs to the cache and activating a replace operation when a miss occurs to the cache, if a miss occurs to the cache, the replace activation can be performed before execution conditions are established, thereby making it possible to reduce the latency when a miss is occurring to the cache. Then, in processing an instruction through the cache replace control, the in-order control can be attained which holds advantages of both an in-order control and an out-of-order control and suffers from no program limitation.

What is claimed is:

1. A processor comprising:
   a selecting unit which selects sequentially access instructions stored in entries of a queue and issues access instructions to access a cache memory;
   a pre-access unit which selects access instructions that have not yet been selected within said entries by said selecting unit, and issues said selected access instructions for pre-accessing said cache memory;
   a unit to access said cache memory with said access instructions issued by said selecting unit and said pre-access unit;
   a unit to issue an instruction to access a memory when a miss occurs to said cache at the time of accessing said cache memory;
   data replace control unit to register data obtained by accessing said memory in said cache memory.

2. A processor as set forth in claim 1, wherein said memory includes a secondary cache memory.

3. A processor as set forth in claim 1, wherein said pre-access unit issues said access instruction for pre-accessing when said selecting unit is not issuing said access instructions.

4. A processor as set forth in claim 1, wherein said pre-access unit pre-accesses said cache memory and issues an instruction to access said memory when a miss occurs to said cache memory.

5. A processor as set forth in claim 3, wherein said pre-access unit registers data obtained by pre-accessing said memory in said cache memory to carry out a data replacement.

6. A processor as set forth in claim 3, wherein said pre-access unit ends said pre-access in the event that said pre-access to said memory fails.

7. A processor as set forth in claim 5, wherein said pre-access unit suppresses a data acknowledgement or data answerback for said data which is data replaced.

8. A processor as set forth in claim 7, wherein said pre-access unit has a unit adapted to ignore acknowledgement and data in a read access.

9. A processor as set forth in claim 7, said pre-access unit has a unit to index said cache memory in read access and to suppress acknowledgement and data transfer when a hit occurs to said cache memory.

10. A processor as set forth in claim 7, wherein said pre-access unit has a unit to index said cache memory in read access and perform a data replacement and suppress acknowledgement and data answerback when a miss occurs to said cache memory.

11. A processor as set forth in claim 7, wherein said pre-access unit has a unit to index said cache memory in write access and to suppress write and acknowledgement when a hit occurs to said cache memory.

12. A processor as set forth in claim 7, wherein said pre-access unit has a unit to index said cache memory in write access and to perform a data replacement and suppress write and acknowledgement when a miss occurs to said cache memory.

13. A processor as set forth in claim 7, wherein said pre-access unit issues a command to index said cache memory in read access and not to make an acknowledgement and data transfer when a hit occurs to said cache memory.

14. A processor as set forth in claim 7, wherein said pre-access unit issues a command to index said cache memory in read access, and to perform a data replacement but not to make an acknowledgement and data transfer when a miss occurs to said cache memory.

15. A processor as set forth in claim 7, wherein said pre-access unit issues a command to index said cache memory in write access and not to perform write and acknowledgement when a hit occurs to said cache memory.

16. A processor as set forth in claim 7, wherein said pre-access unit carries out a type of access which indexes said cache memory in write access, and performs a data replacement but does not perform write and acknowledgement when a miss occurs to said cache memory.

17. A processor as set forth in claim 7, wherein said pre-access unit does not perform a cache hit determination and a data replacement when an error occurs in converting the address of said pre-access.

18. A processor as set forth in claim 10, wherein a cache state is put in an invalid state when a required data access fails.

19. A processor as set forth in claim 10, wherein said pre-access unit has a unit to limit a number of times of simultaneous execution of replacement with respect to said pre-accesses to m (m<n) when the number of times of simultaneous execution of replacement with respect to said accesses and said pre-accesses is a maximum number n.

20. A processor as set forth in claim 19, wherein said pre-access unit reproduces a cache access request for data replacement of a pre-access which is not accepted.

21. A process as set forth in claim 19, wherein said pre-access unit discards a data replacement of a pre-access which is not accepted.

22. A cache controlling device to control an issuance of accesses to a cache memory comprising at least a first queue selection logical circuit, a second queue selection logical circuit and a mediating unit; wherein
   said first queue selection logical circuit sequentially selects access instructions to access said cache memory which are stored in queues from an instruction issuing unit, and issues the selected access instructions; wherein said second queue selection logical circuit selects said access instructions which are stored in entries in entries in the queues from said instruction issuing unit, and that have not yet been selected by said first queue selection logical circuit and issues said selected access instructions for pre-accessing to said cache memory; and wherein said mediating unit sequentially mediates between an access instruction selected by said first queue selection logical circuit and access instruction selected by said second queue selection logical circuit for pre-accessing said cache memory.

23. A processor as set forth in claim 12, wherein a cache state is put in an invalid state when a required data access fails.

24. A processor as set forth in claim 14, wherein a cache state is put in an invalid state when a required data access fails.

25. A processor as set forth in claim 16, wherein a cache state is put in an invalid state when a required data access fails.

26. A processor as set forth in claim 12, wherein said pre-access unit has a unit to limit a number of times of simultaneous execution of replacement with respect to said pre-accesses to m (m<n) when the number of times of simultaneous execution of replacement with respect to said accesses and said pre-accesses is a maximum number n.

27. A processor as set forth in claim 14, wherein said pre-access unit has a unit to limit a number of times of simultaneous execution of replacement with respect to said pre-accesses to m (m<n) when the number of times of simultaneous execution of replacement with respect to said accesses and said pre-accesses is a maximum number n.

28. A processor as set forth in claim 16, wherein said pre-access unit has a unit to limit a number of times of simultaneous execution of replacement with respect to said pre-accesses to m (m<n) when the number of times of simultaneous execution of replacement with respect to said accesses and said pre-accesses is a maximum number n.

29. A processor comprising:

a selecting unit which selects sequentially access instructions stored in entries of a queue and issues access instructions to access a cache memory;

a pre-access unit which selects access instructions that have not yet been selected within said entries by said selecting unit, and issues said selected access instructions for pre-accessing said cache memory;

a unit to access said cache memory with said access instructions issued by said selecting unit and said pre-access unit;

wherein when a miss occurs to said cache using access instructions selected by the selecting unit, the cache is next accessed using the access instructions selected by the pre-access unit.

* * * * *

UNITED STATES PATENT AND TRADEMARK OFFICE
CERTIFICATE OF CORRECTION

PATENT NO. : 6,772,297 B2
DATED : August 3, 2004
INVENTOR(S) : Toshiyuki Muta

It is certified that error appears in the above-identified patent and that said Letters Patent is hereby corrected as shown below:

<u>Column 17,</u>
Line 13, before "access" insert -- an --

Signed and Sealed this

Fourth Day of January, 2005

JON W. DUDAS
*Director of the United States Patent and Trademark Office*